US012396410B1

(12) United States Patent
Fisher

(10) Patent No.: US 12,396,410 B1
(45) Date of Patent: Aug. 26, 2025

(54) IRRIGATION DEVICES AND METHODS OF USE

(71) Applicant: Rocky Fisher, Jenks, OK (US)

(72) Inventor: Rocky Fisher, Jenks, OK (US)

( * ) Notice: Subject to any disclaimer, the term of this patent is extended or adjusted under 35 U.S.C. 154(b) by 0 days.

(21) Appl. No.: 17/066,527

(22) Filed: Oct. 9, 2020

(51) Int. Cl.
*A01G 25/02* (2006.01)
*A01G 25/06* (2006.01)
*B05B 1/06* (2006.01)

(52) U.S. Cl.
CPC ........... *A01G 25/023* (2013.01); *A01G 25/06* (2013.01); *B05B 1/06* (2013.01)

(58) Field of Classification Search
CPC ......... A01G 25/023; A01G 25/06; B05B 1/06
See application file for complete search history.

(56) References Cited

U.S. PATENT DOCUMENTS

| | | | |
|---|---|---|---|
| 6,023,883 A * | 2/2000 | Bacon, Jr. .............. | A01G 25/02 47/48.5 |
| 7,581,656 B2 * | 9/2009 | Gnepper .................. | B65D 1/40 220/604 |
| 9,462,762 B2 * | 10/2016 | Sheets .................. | A01G 25/167 |
| 10,492,376 B2 | 12/2019 | Marshall | |
| 2012/0080538 A1 | 4/2012 | Reid et al. | |

* cited by examiner

*Primary Examiner* — Steven M Cernoch
(74) *Attorney, Agent, or Firm* — Lexigent LLC

(57) ABSTRACT

Irrigation devices and methods are disclosed herein. An example device includes a semi-circular enclosure having a top portion and a bottom portion, the top portion including an input port disposed on a top surface of the top portion; and a first lever, the bottom portion including: a channel having at least one drip aperture; a second lever. The first lever is offset from the second lever when the top portion and the bottom portion are joined together, and the first lever and the second lever are configured to be gripped by a user when separating the top portion from the bottom portion.

10 Claims, 5 Drawing Sheets

IRRIGATION DEVICES AND METHODS OF USE

CROSS-REFERENCE TO RELATED APPLICATION(S)

N/A

TECHNICAL FIELD

The present disclosure relates to irrigation devices, and more specifically, but not by limitation, to irrigation devices that at least partially surround a portion of a plant and drip water into the soil above the root structure of the plant. The irrigation devices are multipart and can be opened for cleaning using levers that extend from complementary parts of the irrigation devices.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

As noted, the present disclosure pertains to irrigation devices and methods of use. An example irrigation device can include a substantially c-shaped body that is comprised of two portions, namely a top portion and a bottom portion. The bottom portion includes a channel having a plurality of drip apertures. The Each of the top portion and the bottom portion include a lever. A lever of the top portion is used in combination with a lever of the bottom portion to separate the top portion from the bottom portion when the top portion and the bottom portion have been joined together. This allows for cleaning of the inner surfaces of the bottom portion that may become obstructed with particulates from water or fertilizers that flow through the irrigation device.

Some embodiments may include optional features such as wicking spikes and an input port with a hose interface that allows the irrigation device to couple with an irrigation system. These and other advantages of the present disclosure are described herein with reference to the collective drawings.

EXAMPLE EMBODIMENTS

Figure 1:
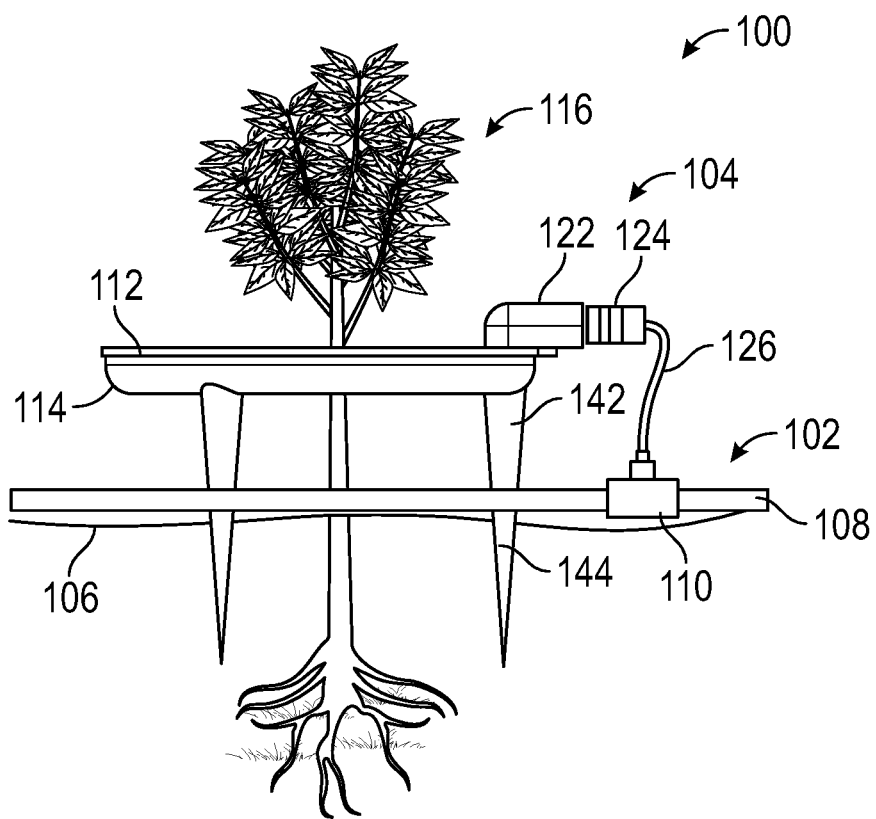
FIG. 1 depicts an illustrative architecture in which techniques and structures for providing the systems and methods disclosed herein may be implemented, including an example irrigation device of the present disclosure.
Figure 10:
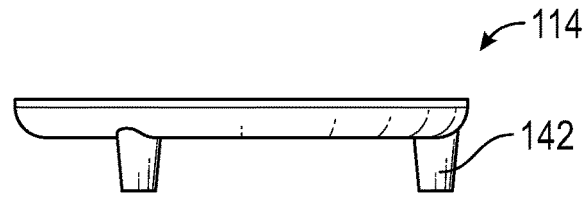
FIG. 10 is a rear elevation view of a bottom portion of the example irrigation device of FIG. 2.

Turning now to the drawings, FIG. 1 depicts an illustrative architecture in which techniques and structures of the present disclosure may be implemented. The architecture includes an irrigation system 100 which comprises a fluid supply assembly 102 and an irrigation device 104. The irrigation device 104 is illustrated as being inserted into soil 106. The fluid supply assembly 102 comprises tubing 108 and a tap 110. Additional details of the fluid supply assembly 102 are disclosed infra with respect to the disclosure of FIGS. 10 and 11.

FIGS. 2-10 collectively illustrate details of the irrigation device 104. In general, the irrigation device 104 comprises a top portion 112 and a bottom portion 114. Further, the top portion 112 and the bottom portion 114 can be joined together to form an enclosure that receives a fluid from the fluid supply assembly 102.

For example, the irrigation device 104 can be coupled to the tap 110 of the fluid supply assembly 102. The irrigation device 104 is substantially c-shaped, but can be shaped as desired. The irrigation device 104 at least partially surrounds a plant 116. The irrigation device 104 can deliver fluids to the plant 116, such as water and/or fertilizer. In some embodiments, the irrigation device 104 can deliver fluid to an upper surface of the soil 106, and/or in other embodiments (see FIG. 12) to a root structure of the plant 116 below the upper surface of the soil 106 (see FIG. 1).

In FIGS. 3-6, the top portion 112 comprises a plate 118 and flange 120 that extends below the plate 118. The top portion 112 also comprises an input port 122 that receives a hose interface 124 that couples with an irrigation line 126. The irrigation line 126 can interface with the tap 110 of the irrigation supply assembly 102 (see FIG. 1). The input port 122 is disposed on an upper surface 128 of the top portion 112. The input port 122 is in fluid communication with a pathway 130 that allows a fluid to communicate into the irrigation device 104 from the fluid supply assembly 102. The hose interface 124 can be configured to plug into the input port 122. The hose interface 124 can include ridges or a gasket that provides a watertight seal to prevent backflow of fluid.

The top portion 112 also comprises a first lever 130 that extends from the plate 118. The first lever 130 includes a tab that extends from an outer-peripheral edge 132 of the plate 118. In some embodiments, the first lever 130 includes texturing 133 that allows a user to grip the first lever 130. The texturing could include ridges, protrusions, grooves, knurling, or other similar features.

Referring now to FIGS. 7-10, the bottom portion 114 includes a body portion that is a substantially c-shaped channel 134. The bottom portion 114 includes a groove 136 that traverses an upper edge of the substantially c-shaped channel 134. The groove 136 is configured to receive the flange 120 of the top portion 112 when the top portion 112 is joined to the bottom portion 114. In some embodiments, the joining of the top portion 112 with the bottom portion 114 includes a compression or interference fit that allows the top portion 112 and the bottom portion 114 to be secured together in a releasable manner. That is, the top portion 112 can be joined to the bottom portion 114 in such a way that the two portions can be separated.

The substantially c-shaped channel 134 comprises a plurality of drip apertures, such as drip aperture 138. The drip apertures allow fluid that is within the irrigation device 104 to drip out onto the upper surface of the soil (see FIG. 1). In some instances, the bottom portion 114 comprises a second lever 140 that extends beyond an outer-peripheral edge of the substantially c-shaped channel 134. While a substantially c-shaped channel 134 has been illustrated, the shape of the bottom portion 114 can be adjusted as desired. To be sure, adjustments to the dimensions or configurations of the bottom portion 114 may predicate changes in the dimensions or configurations of the top portion 112 to allow these portions to join together.

Figure 2:
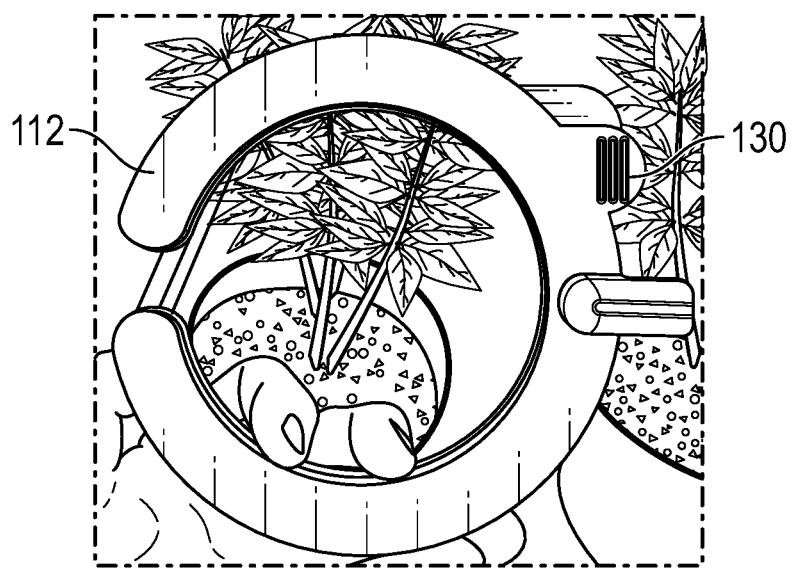
FIG. 2 is a perspective view of an example irrigation device of the present disclosure.
Figure 3:
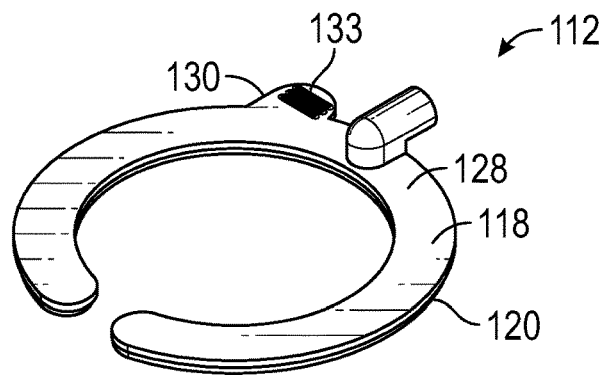
FIG. 3 is a perspective view of a top portion of the example irrigation device of FIG. 2.
Figure 4:
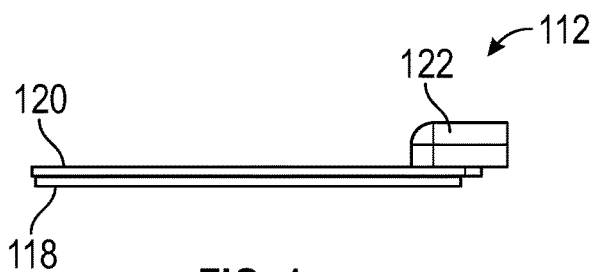
FIG. 4 is an elevation view of a top portion of the example irrigation device of FIG. 2.
Figure 5:
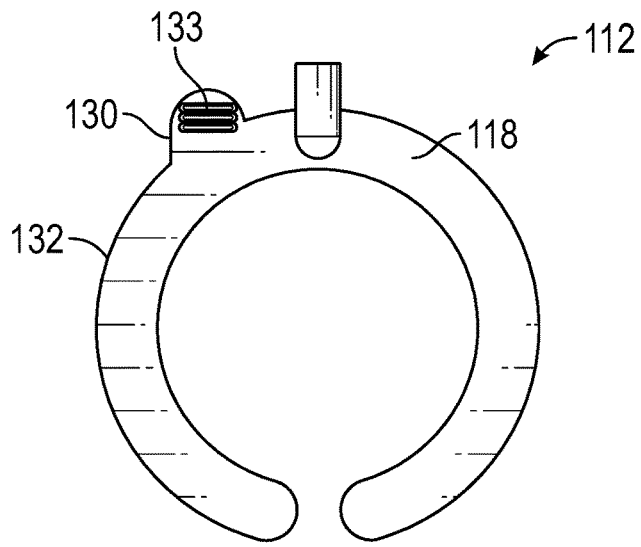
FIG. 5 is a top view of a top portion of the example irrigation device of FIG. 2.
Figure 6:
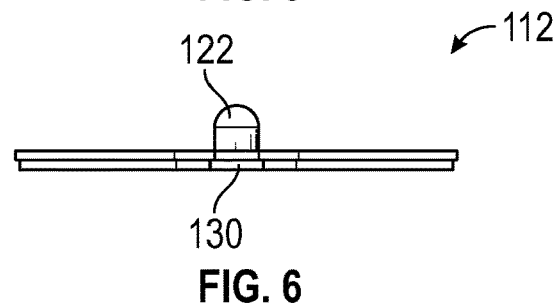
FIG. 6 is a rear elevation view of a top portion of the example irrigation device of FIG. 2.
Figure 7:
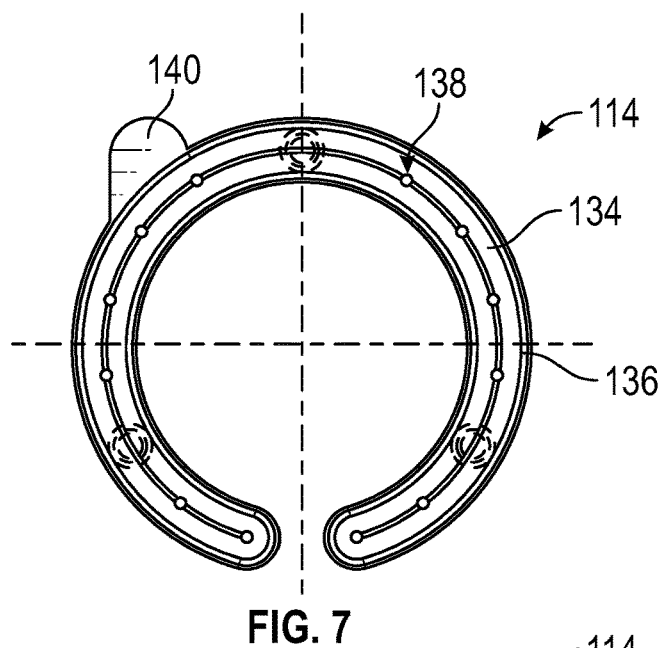
FIG. 7 is a perspective view of a bottom portion of the example irrigation device of FIG. 2.
Figure 8:
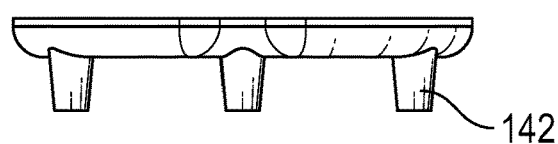
FIG. 8 is an elevation view of a bottom portion of the example irrigation device of FIG. 2.
Figure 9:
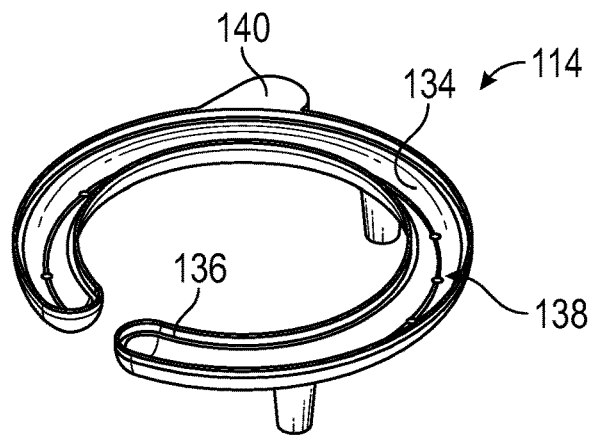
FIG. 9 is a top view of a bottom portion of the example irrigation device of FIG. 2.

As best illustrated in FIG. 2, when the top portion 112 and the bottom portion 114 are joined, the first lever 130 of the top portion 114 is slightly offset (laterally) from the second lever 140 of the bottom portion 114. This offsetting allows for the user to be able to engage both the first lever 130 and the second lever 140 simultaneously. The user to apply an upward force to the first lever 130 and a downward (opposing) force to the second lever 140 to separate the top portion 112 from the bottom portion 114. For example, the user can utilize their thumb to place a downward force onto the second lever 140 while using their index finger to apply an upward force to the first lever 130. This action causes the flange 120 of the top portion 112 to disengage from the groove 136 of the bottom portion 114.

In some embodiments, the bottom portion 114 also includes a plurality of plurality of receivers, such as receiver 142 that each configured to receive an elongated spike 144 (see FIG. 1). The spikes allow the irrigation device 104 to be supported and elevated relative to the soil.

Figure 11:
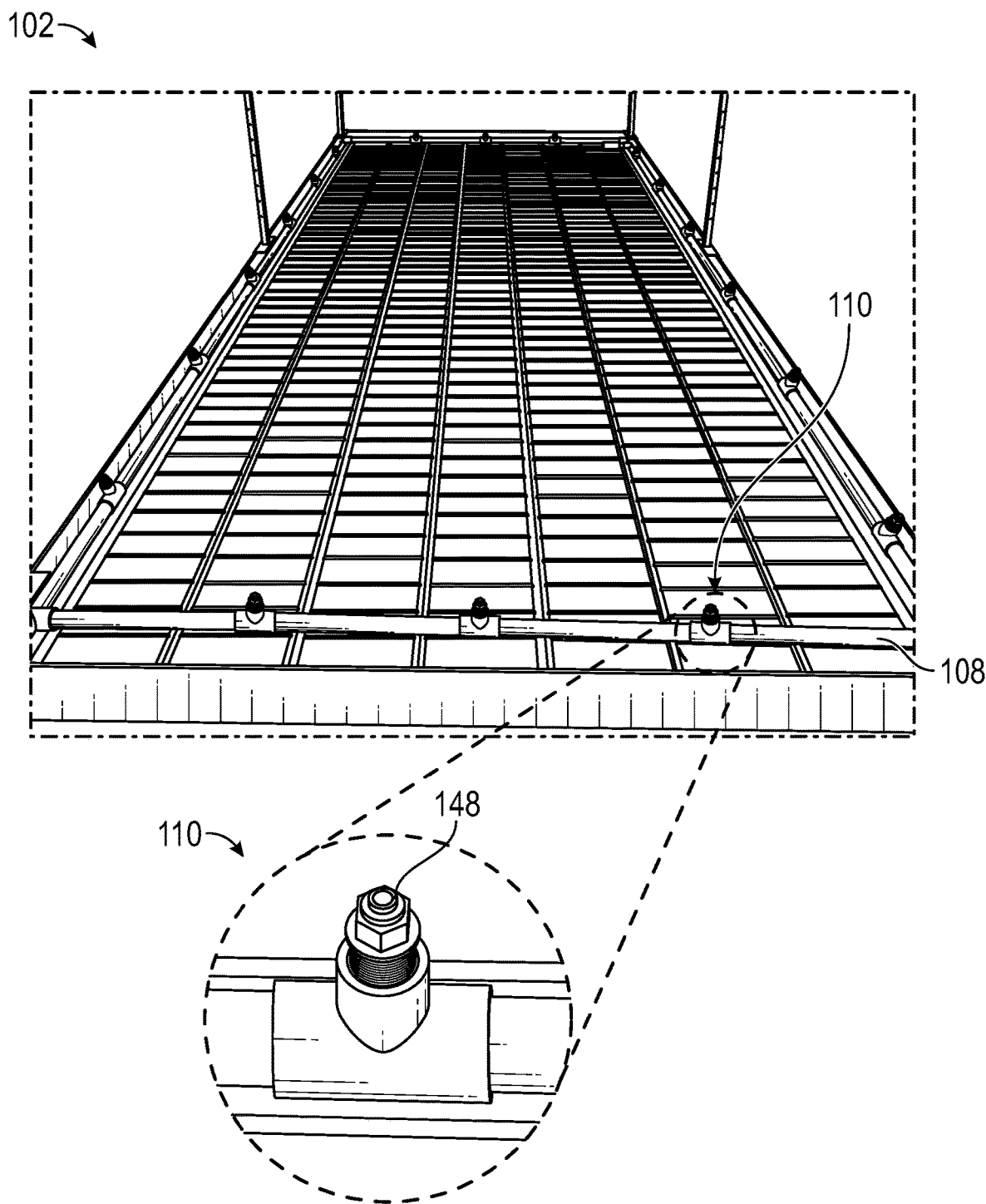
FIG. 11 is a perspective view of an example irrigation system for use in accordance with the embodiments of the present disclosure.

FIGS. 1 and 11 cooperatively illustrate the fluid supply assembly 102. The fluid supply assembly 102 can comprise sections of the tubing 108 that are interconnected by taps (see tap 110). The tap 110 includes a nipple 146 that receives a terminal end of the irrigation line 126. Thus, one end of the irrigation line 126 is joined to the hose interface 124 (see FIG. 1), and one end of the irrigation line 126 is joined to the tap 110. The tap 110 can include a threaded compressive fitting 148 that can lightly clamp down on the end of the irrigation line 126 to secure the irrigation line 126 in place and prevent leakage of fluid. The sections of the tubing 108 can be arranged as desired, but in some embodiments are arranged around a table where individual plants are placed. In this example, the fluid supply assembly 102 that includes a plurality of tubing sections that are interconnected with taps form a continuous circuit. This circuit is connected to a feed that provides the fluid supply assembly 102 with fluid such as water and/or enhancements such as fertilizers. The feed provides fluid into the fluid supply assembly 102 at a specific hydrostatic pressure. Because the fluid supply assembly 102 is a continuous circuit, the fluid received from the feed is applied into the fluid supply assembly 102 fills the fluid supply assembly 102 at a consistent pressure. This ensures that each of the taps outputs fluid from at the same rate regardless of its position or location on the fluid supply assembly 102.

Figure 12:
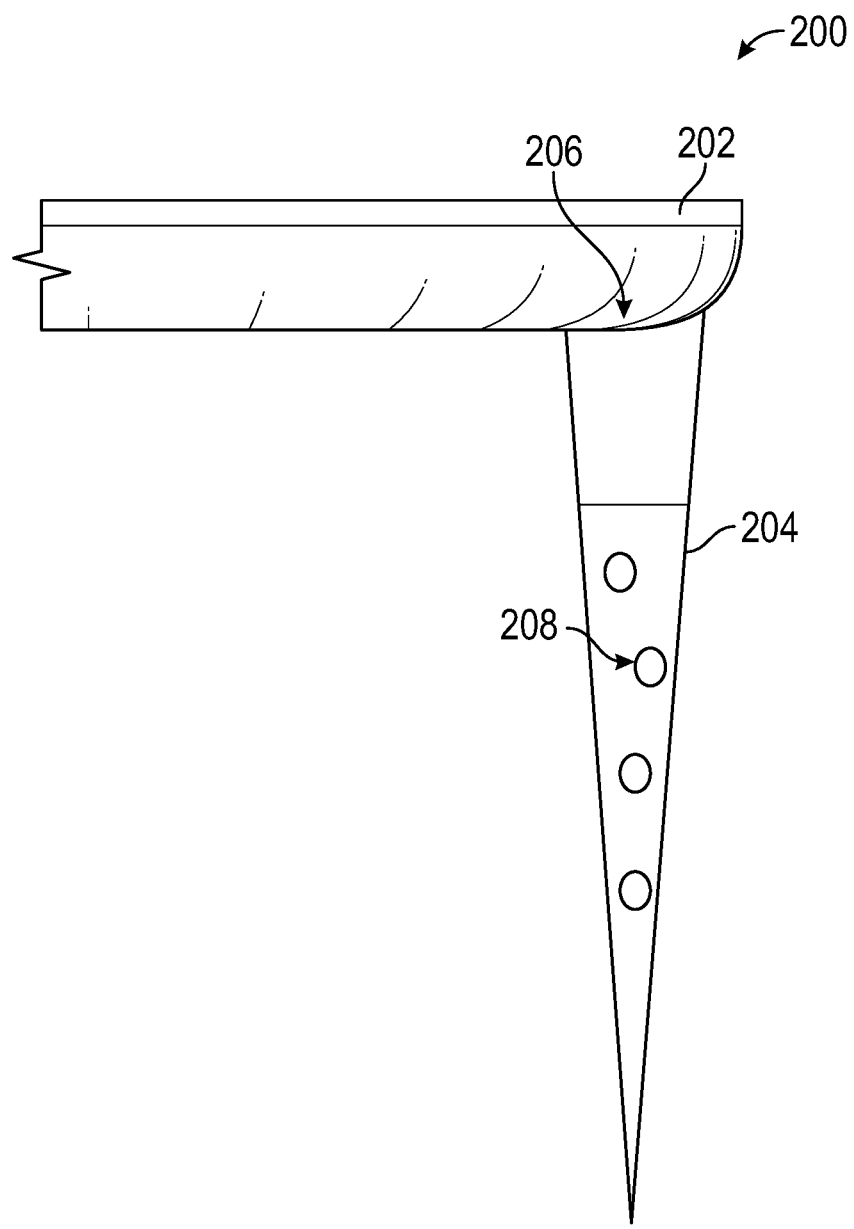
FIG. 12 is a partial cross-sectional view of an example irrigation device with a perforated spike.

FIG. 12 is a partial, cross-sectional view of another example irrigation device 200. The irrigation device 200 can be constructed similarly to that of the irrigation device 104 of FIGS. 1-10 with the exception that the irrigation device 200 includes a bottom portion 202 having a perforated spike 204. The bottom portion 204 includes a pathway or aperture 206 that provides a pathway for fluid to communicate from within the irrigation device 200 downwardly into the perforated spike 204. The bottom portion 202 can have drip apertures as disclosed above, in addition to the perforated spike 204. The perforated spike 204 includes wicking apertures 208 that allow fluid to permeate or percolate into the soil when the perforated spike is inserted into the soil. In this way, the irrigation device 200 can water the upper part of the soil, in addition to the roots of the plant with the perforated spike 204. The use of the perforated spike 204 allows for deeper watering in some instances.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

That which is claimed is:

1. A device, comprising: a semi-circular enclosure having a top portion and a bottom portion;
   the top portion comprising:
   an input port disposed on a top surface of the top portion; and
   a first lever integrally formed with the top portion, wherein the first lever extends beyond an outer-peripheral edge of the top portion, and an upper surface of the first lever extends in a coplanar and continuous manner to an upper surface of the top portion; and
   a downwardly extending continuous flange disposed along a lower surface of the top portion; the bottom portion comprising:
   a substantially c-shaped channel having at least one drip aperture disposed in a lower surface thereof;
   a continuous groove disposed along an upper edge of the substantially c-shaped channel, the continuous groove dimensioned to receive the downwardly extending continuous flange of the top portion in an interference fit when the top portion and bottom portion are joined together, the continuous groove and the downwardly extending continuous flange collectively forming a watertight seal about an entirety of the entire semi-circular enclosure to prevent fluid leakage;
   a second lever integrally formed with the bottom portion, wherein the second lever extends beyond an outer-peripheral edge of the
   bottom portion, wherein the second lever has an upper surface that is coplanar with an upper edge of the substantially c-shaped channel;
   wherein the first lever has a lower surface that faces towards the bottom portion and the upper surface of the second lever faces towards the top portion, further wherein the first lever and the second lever mate in face-to-face relationship such that the lower surface and the upper surface directly contact one another when the top portion and the bottom portion are joined together, and wherein the first lever and the second lever extend outwardly in opposite directions from opposite peripheral edges of the semi-circular enclosure, the first lever is longer than the second lever, allowing a user to grip the first lever and the second lever simultaneously with fingers of a same hand to apply an upward force to the first lever and a downward force to the second lever to separate the top portion from the bottom portion, and wherein the input port comprises a hose interface configured to directly couple an irrigation line under pressure to the semi-circular enclosure for providing pressurized fluid directly into the enclosure.

2. The device according to claim 1, wherein the input port receives a hose interface that couples with an irrigation line, wherein the hose interface, when received by the input port, has a top surface that is coplanar with the upper surface of the top portion.

3. The device according to claim 1, further comprising a plurality of receivers that are each configured to receive an elongated spike.

4. The device according to claim 3, wherein at least one of the plurality of receivers is in fluid communication with the semi-circular enclosure, and the elongated spike has wicking apertures that receive a fluid.

5. The device according to claim 1, wherein the upper surface of the first lever is textured.

6. The device according to claim 1, wherein the top portion snaps onto the bottom portion.

7. The device according to claim 1, wherein the top portion comprises a flange and the bottom portion comprises a groove that receives the flange of the top portion when the top portion and the bottom portion are joined together, wherein the flange is a continuous member that protrudes from a bottom of the top portion and the groove is also continuous and creates a compression or interference fit.

8. The device according to claim 1, wherein the first lever and the second lever are at least partially overlapping one another.

9. The device according to claim 1, wherein the first lever and the second lever are at least partially in vertical alignment with one another.

10. The device according to claim 1, wherein the first lever and the second lever extend away from the top portion and the bottom portion, respectively, and the first lever is longer than the second lever so that the first lever and the second lever can be manipulated by fingers of a same hand of a user at a same time.

* * * * *